(12) United States Patent
Otsuka et al.

(10) Patent No.: US 11,943,529 B2
(45) Date of Patent: Mar. 26, 2024

(54) IMAGING APPARATUS

(71) Applicant: Panasonic Intellectual Property Management Co., Ltd., Osaka (JP)

(72) Inventors: Koichi Otsuka, Osaka (JP); Ryo Kotaki, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/973,018

(22) Filed: Oct. 25, 2022

(65) Prior Publication Data
US 2023/0136111 A1    May 4, 2023

(30) Foreign Application Priority Data

Nov. 1, 2021   (JP) ................. 2021-178647

(51) Int. Cl.
*H04N 23/62* (2023.01)
*H04N 7/015* (2006.01)
*H04N 23/63* (2023.01)

(52) U.S. Cl.
CPC ............. *H04N 23/62* (2023.01); *H04N 7/015* (2013.01); *H04N 23/633* (2023.01)

(58) Field of Classification Search
CPC ...... H04N 23/62; H04N 23/633; H04N 23/66; H04N 23/661; H04N 23/662; H04N 23/663; H04N 7/015
See application file for complete search history.

(56) References Cited

U.S. PATENT DOCUMENTS 8,089,505 B2 *   1/2012   Arima .................. H04N 7/18
                                                        348/14.07
2008/0284856 A1   11/2008   Okazaki
(Continued)

FOREIGN PATENT DOCUMENTS

| JP | 2005-176272 A | 6/2005 |
| JP | 2008-098819 A | 4/2008 |
| JP | 2018-201076 A | 12/2018 |

(Continued)

OTHER PUBLICATIONS

Japanese Office Action dated Mar. 1, 2022 for the corresponding Japanese Patent Application No. 2021-178647 with its Machine English.

*Primary Examiner* — Kelly L Jerabek
(74) *Attorney, Agent, or Firm* — Renner, Otto, Boisselle & Sklar, LLP

(57) ABSTRACT

An imaging apparatus, not including a display that displays setting information for operation setting in the imaging apparatus, includes: an image sensor that captures a subject image to generate image data; an output interface connected to an external apparatus to output the image data; and a controller that controls an output setting for outputting the image data in a predetermined format from the output interface to the external apparatus. In a state where the output setting is applied, no setting information for canceling the output setting is displayed on the external apparatus serving as an output destination of the image data in the predetermined format by the output interface. The imaging apparatus further comprises an input interface that receives an instruction to cancel the output setting from the state where the output setting is applied.

10 Claims, 6 Drawing Sheets

(56) References Cited

U.S. PATENT DOCUMENTS

2010/0111489 A1* 5/2010 Presler .................. H04N 25/75
348/222.1
2015/0350504 A1* 12/2015 Corcoran ............... H04N 23/55
348/211.99

FOREIGN PATENT DOCUMENTS

JP          2019-118029 A     7/2019
JP          2021-005798 A     1/2021

* cited by examiner

IMAGING APPARATUS

BACKGROUND

1. Technical Field

The present disclosure relates to an imaging apparatus not including a display, such as a box camera.

DESCRIPTION OF THE RELATED ART

JP 2018-201076 A discloses an image processing device intended to reduce the possibility of impairing the convenience of the user in a digital camera or the like in which video output and functions are limited for each video output terminal. The image processing device includes a first output means that outputs an image signal of HDMI (registered trademark), a second output means that outputs an image signal of SDI, and an assist means that assists imaging by an imaging means. When an external apparatus is connected to the first output means, the image processing device performs control of outputting an image signal from the first output means only when a state in which the assist means is set to be disabled is satisfied.

SUMMARY

The present disclosure provides an imaging apparatus capable of facilitating use of a setting of outputting data to an external apparatus in an imaging apparatus in which setting information is not displayed.

In the present disclosure, there is provided an imaging apparatus not including a display configured to display setting information for operation setting in the imaging apparatus. The imaging apparatus includes: an image sensor that captures a subject image to generate image data; an output interface connected to an external apparatus to output the image data; and a controller that controls an output setting for outputting the image data in a predetermined format from the output interface to the external apparatus. In a state where the output setting is applied, no setting information for canceling the output setting is displayed on the external apparatus serving as an output destination of the image data in the predetermined format by the output interface, and the imaging apparatus further includes an input interface that receives an instruction to cancel the output setting from the state where the output setting is applied.

According to an imaging apparatus in the present disclosure, it is possible to facilitate use of a setting of outputting data to an external apparatus in an imaging apparatus in which setting information is not displayed.

DETAILED DESCRIPTION

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art. It should be noted that the inventor provides the accompanying drawings and the following description for a person skilled in the art to fully understand the present disclosure. Thus, the drawings and the description are not intended to limit the subject matter defined in the claims.

First Embodiment

In the first embodiment, as an example of the imaging apparatus according to the present disclosure, a box-type digital camera not including a display in the own apparatus will be described.

1. Configuration

Figure 1:
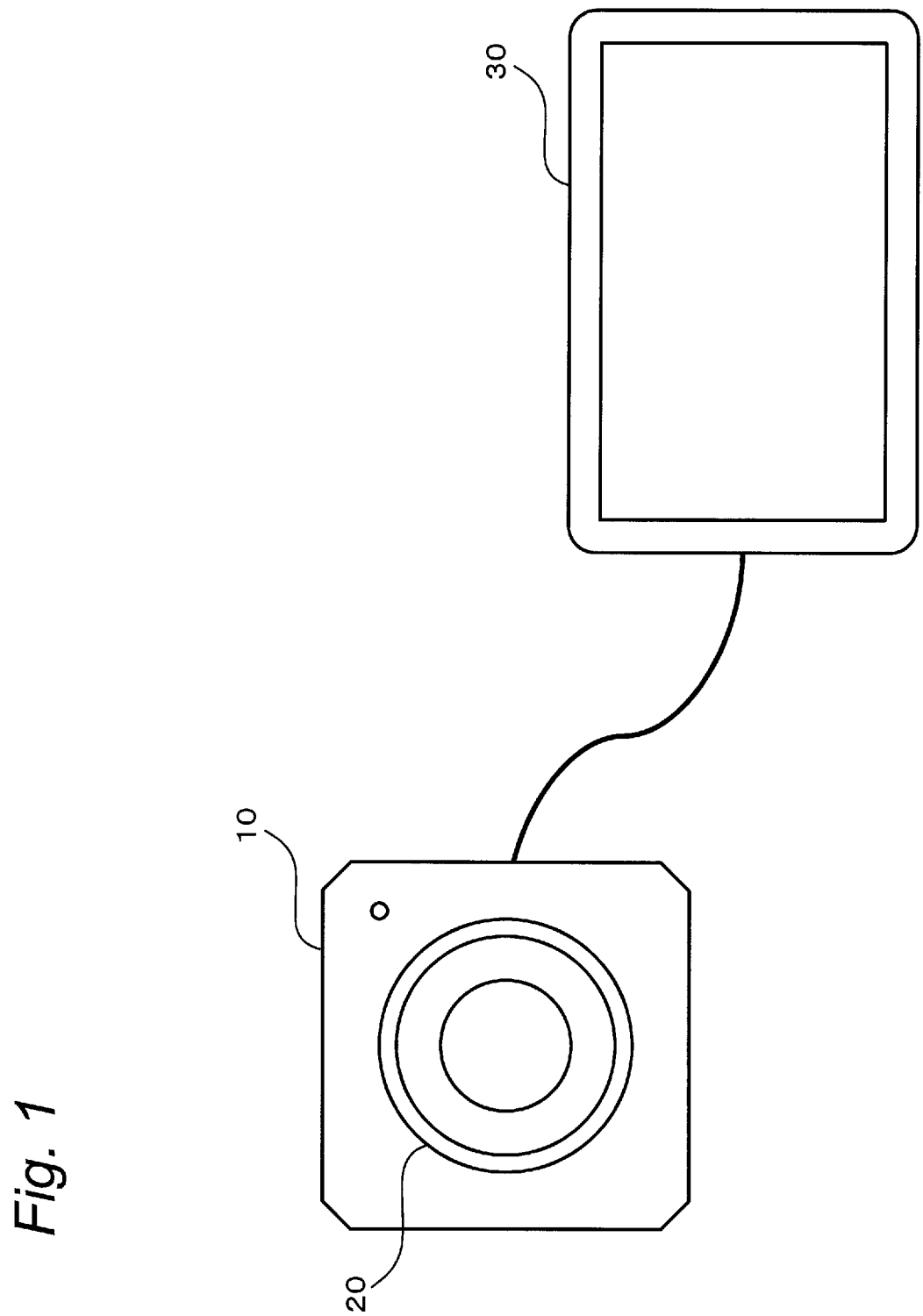
FIG. 1 is a diagram for illustrating an overview of a digital camera according to a first embodiment of the present disclosure.

A configuration of a digital camera according to the first embodiment will be described with reference to FIGS. 1 to 2. FIG. 1 is a diagram for illustrating an overview of a digital camera 10 according to the present embodiment.

The digital camera 10 of the present embodiment is configured to be connectable to various external apparatuses in, for example, a box-shaped apparatus body. With this digital camera 10, it is possible for the user to easily perform extension or the like on desired functions.

FIG. 1 illustrates a state in which a monitor 30 in an external configuration is connected to the digital camera 10 of the present embodiment via a communication cable. The digital camera 10 of the present embodiment is not particularly provided with a monitor, a viewfinder, or the like in the apparatus body. When desiring to check a live view image captured in real time by the digital camera 10, a setting menu, or the like, the user connects the external monitor 30 to the digital camera 10 to cause the external monitor 30 to perform desired display, for example. In addition, the digital camera 10 is, an interchangeable lens type, and is configured so that the interchangeable lens 20 can be mounted, for example.

1-1. Configuration of Digital Camera

Figure 2:
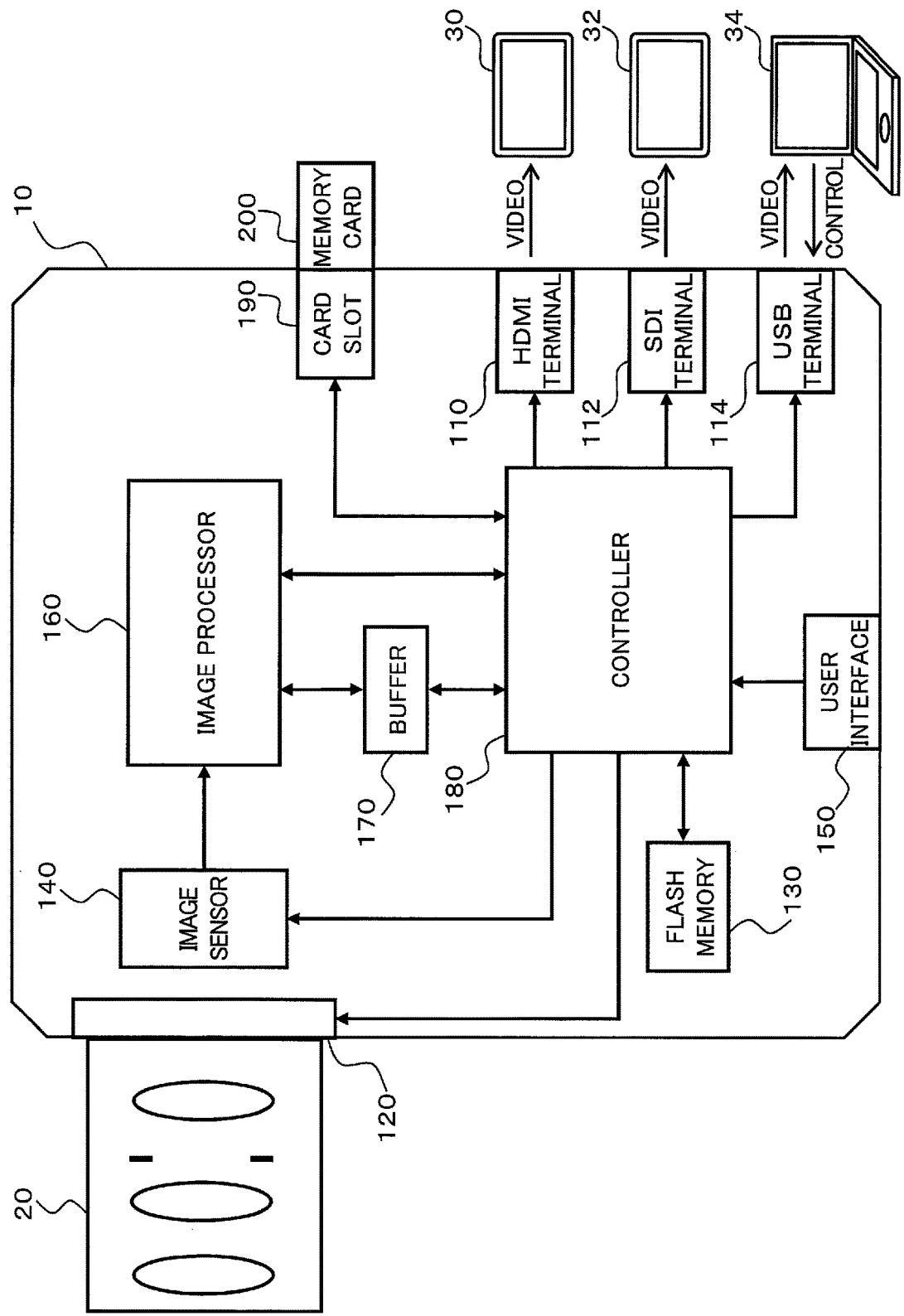
FIG. 2 is a diagram illustrating a configuration of a digital camera according to the first embodiment.

FIG. 2 is a diagram showing a configuration of a digital camera 10 according to the present embodiment. The digital camera 10 of the present embodiment includes a mount 120 for the interchangeable lens 20, an image sensor 140, a user interface 150, an image processor 160, a buffer memory 170, and a controller 180, for example. Furthermore, the digital camera 10 includes a flash memory 130, a card slot 190, and various connection terminals 110, 112, and 114. The various connection terminals 110 to 114 include an HDMI terminal 110, an SDI terminal 112, and a USB terminal 114, for example.

The interchangeable lens 20 includes an optical system such as a zoom lens, a focus lens, and a diaphragm, a driver, and the like. The zoom lens is a lens for changing the magnification of the subject image formed by the optical system. The focus lens is a lens for changing the focus state of the subject image formed on the image sensor 140. The zoom lens and the focus lens are formed of one or more lenses.

The driver of the interchangeable lens 20 includes configurations each for driving a corresponding one element of the optical system, such as the focus lens. For example, the driver of the focus lens includes a motor, and moves the focus lens along the optical axis of the optical system under the control of the controller 180. The configuration for driving each element of the optical system in the driver of the interchangeable lens 20 can be achieved by a DC motor, a stepping motor, a servo motor, an ultrasonic motor, or the like.

The mount 120 is an attachment unit for detachably mounting the interchangeable lens 20 in the digital camera 10. The mount 120 includes an interface circuit that performs various data communication between the digital camera 10 and the interchangeable lens 20.

The image sensor 140 captures a subject image incident via the optical system of the interchangeable lens 20 to generates RAW data, for example. The RAW data is an example of image data in RAW format corresponding to a state of an imaging result by the image sensor 140. For example, the RAW data includes information on the light quantity exposed for each pixel in the Bayer array, and indicates an image of an imaging result. The image sensor 140 performs an imaging operation of an image constituting each frame of a moving image, for example. The image sensor 140 is an example of an image sensor in the present embodiment.

The image sensor 140 generates RAW data of a new frame at a predetermined frame rate (e.g., 30 frames/sec). The RAW data generation timing and the electronic shutter operation in the image sensor 140 are controlled by the controller 180. As the image sensor 140, various image sensors such as a CMOS image sensor, a CCD image sensor, or an NMOS image sensor can be used.

The user interface 150 is a general term for operation members that receive an operation (instruction) from a user. The user interface 150 includes buttons, levers, dials, switches, and the like that receive user operations. A specific example of the user interface 150 will be described below.

The image processor 160 performs predetermined processing on the RAW data output from the image sensor 140 to generate image data of a shooting result. For example, the image processor 160 may perform processing for development and may generate an image to be displayed on the external monitor 30 or the like. Examples of the predetermined processing include debayer processing, white balance correction, gamma correction, YC conversion processing, electronic zoom processing, compression processing, expansion processing, and the like, but are not limited thereto. The image processor 160 may be configured with a hard-wired electronic circuit, or may be configured with a microcomputer, a processor, or the like using a program.

The buffer memory 170 is a recording medium that functions as a work memory for the image processor 160 and the controller 180. The buffer memory 170 is implemented with a dynamic random-access memory (DRAM) or the like. The flash memory 130 is a non-volatile recording medium. Each of the memories 130 and 170 is an example of a storage in the present embodiment.

The controller 180 controls the operations whole of the digital camera 10. The controller 180 uses the buffer memory 170 as a work memory during a control operation or an image processing operation.

The controller 180 includes a CPU or an MPU, and the CPU or MPU implements a predetermined function by executing a program (software). The controller 180 may include a processor including a dedicated electronic circuit designed to achieve a predetermined function instead of the CPU or the like. That is, the controller 180 can be implemented with various processors such as a CPU, an MPU, a GPU, a DSU, an FPGA, and an ASIC. The controller 180 may include one or more processors.

The card slot 190 can mount the memory card 200, and accesses the memory card 200 based on the control from the controller 180. The digital camera 10 can record image data in the memory card 200 and read the recorded image data from the memory card 200.

In the present embodiment, an example in which the external monitor 30 is connected to the HDMI terminal 110 of the digital camera 10 will be described. The external monitor 30 is an example of an external apparatus that displays an image and the like. The external monitor 30 has a function of performing development processing on an image of RAW data input from the digital camera 10 in a displayable manner, for example. In addition, the external monitor 30 may have a recorder function of recording, for example, moving image data or the like indicating a displayed image in a recording medium.

In the digital camera 10, the HDMI terminal 110 is a connection terminal connected to an external apparatus such as the external monitor 30 via, for example, a communication cable and for outputting a digital signal such as an image signal in data communication conforming to the HDMI standard. The HDMI terminal 110 is an example of an output interface in the digital camera 10 of the present embodiment.

The SDI terminal 112 is a connection terminal for outputting a digital signal to the connected external apparatus in conformity with the SDI standard. A display apparatus such as a monitor 32 different from the external monitor 30 connected to the HDMI terminal 110 is connected to the SDI terminal 112, for example. A plurality of monitors may be connected to the digital camera 10 according to various uses.

The USB terminal 114 is a connection terminal that performs data communication between the connected external apparatus and the digital camera 10 in conformity with the USB standard. For example, an information terminal 34 functioning as a display apparatus of a personal computer (PC), a smartphone, or the like is connected to the USB terminal 114. Each of the terminals 112 and 114 is an example of a communication interface in the digital camera 10. The information terminal 34 may transmit various control signals to the digital camera 10. Hereinafter, the communication connection between the digital camera 10 and the information terminal 34 may be referred to as a Tether connection.

The output interface and the communication interface of the digital camera 10 are not particularly limited to the above. For example, the digital camera 10 may be provided with an interface circuit that performs data communication in conformity with a communication standard corresponding to the various terminals 110 to 114, and the output interface or the communication interface may include such an interface circuit. In addition, the communication standards are not limited to the above communication standards, and various wired or wireless communication standards may be adopted.

1-2. User Interface

A specific example of the user interface 150 in the digital camera 10 will be described with reference to FIG. 3. FIG.

3 is a diagram illustrating a user interface 150 and a setting menu of the digital camera 10.

Figure 3:
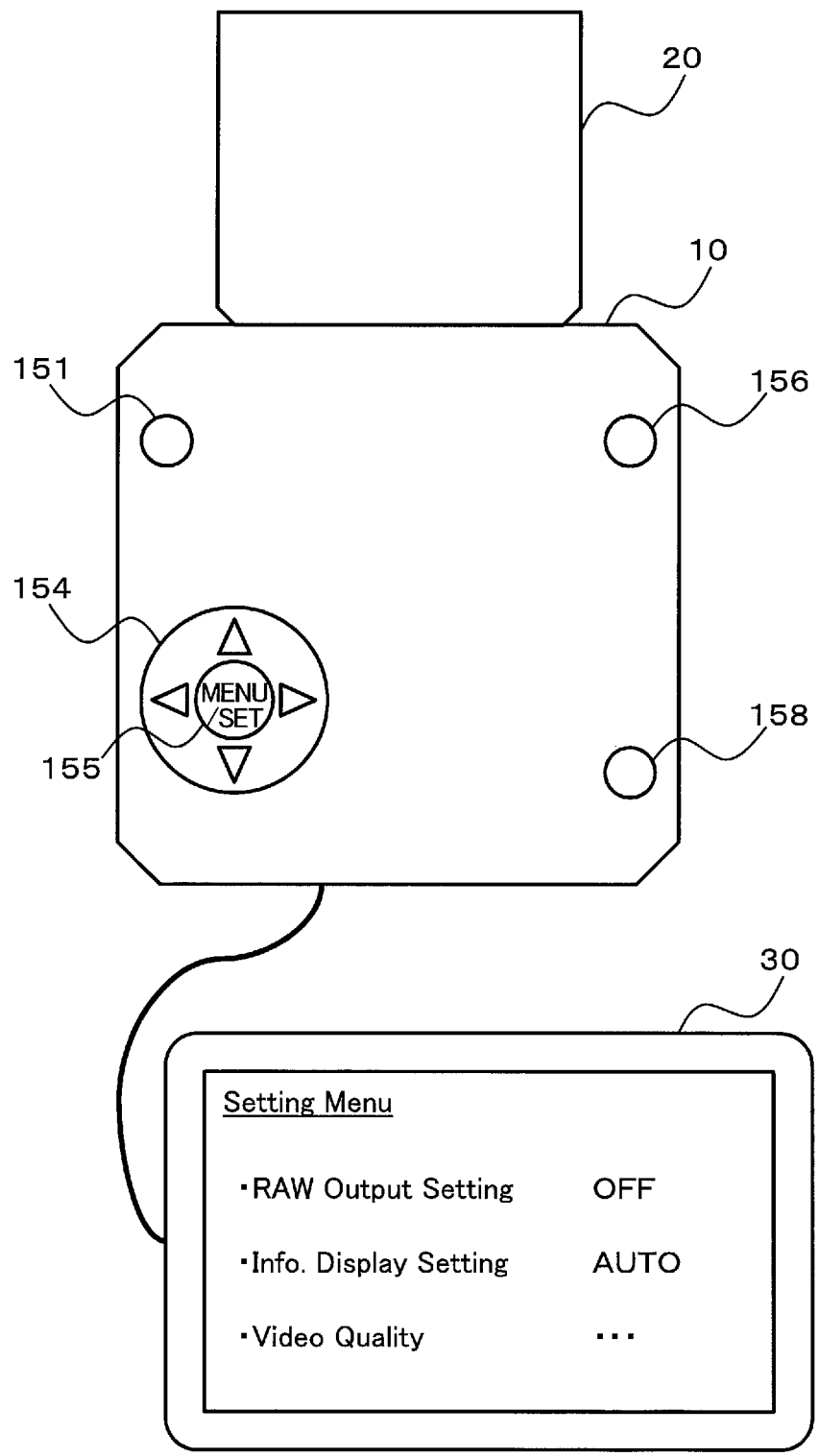
FIG. 3 is a diagram illustrating a user interface and a setting menu of the digital camera.

FIG. 3 shows a shooting button 151, a selection button 154, and a plurality of function buttons (Fn buttons) 156 and 158 as an example of the user interface 150 provided on the side surface of the digital camera 10. When receiving an operation by the user, the user interface 150 transmits various instruction signals to the controller 180.

For example, the shooting button 151 is a depression type button for starting/ending shooting recording of a moving image. The controller 180 controls recording of a moving image data in the memory card 200 or the like in response to the depressing operation of the shooting button 151, for example.

The selection button 154 includes a depression type buttons provided in the up, down, left, and right directions and a depression type MENU/SET button 155 provided at the center. For example, when the user depresses the MENU/SET button 155 with the digital camera 10 being in a predetermined operation mode, the controller 180 causes the external monitor 30 to display a setting menu.

FIG. 3 illustrates a state in which a setting menu screen is displayed on the external monitor 30 connected to the digital camera 10. The setting menu is an example of setting information for setting various operations such as shooting in the digital camera 10.

The user can select various menu items or options displayed on the screen of the setting menu or move the cursor by depressing any one of the selection buttons 154 of the up, down, left, and right directions. When the MENU/SET button 155 is depressed in a state where a specific menu item is selected in the setting menu, the controller 180 causes the external monitor 30 to display an option of changing the setting of the selected menu item. Furthermore, when the MENU/SET button 155 is depressed in a state where a specific option is selected, the controller 180 establishes the setting of the selected menu item reflecting the option.

Each of the Fn buttons 156 and 158 is a depression type button to which a specific function in the digital camera 10 can be assigned by, for example, a user operation in a setting menu. In the present embodiment, a case where a function of turning ON/OFF the RAW output setting described below is assigned to the Fn button 156 will be described.

2. Operation

The operation of the digital camera 10 configured as described above will be described in the following.

2-1. Outline of Operation

The digital camera 10 of the present embodiment has a RAW output setting that is a setting for outputting RAW data such as a moving image to the external monitor 30 connected to the HDMI terminal 110, for example. When the RAW output setting is applied, a moving image of RAW data during shooting in the digital camera 10 can be displayed or recorded on the external monitor 30.

For example, as shown in FIG. 3, the setting menu of the digital camera 10 includes a menu item for allowing the user to select ON/OFF of whether or not to apply the RAW output setting. In this case, the user can cause the external monitor 30 to display a setting menu from a state in which the RAW output setting of the digital camera 10 is OFF, and turn ON the RAW output setting from the setting menu displayed on the external monitor 30.

With regard to the ON/OFF of the RAW output setting as described above, the inventors of the present application have revealed the following problems through energetic research.

That is, in a state where the RAW output setting is turned ON, the setting menu cannot be displayed on the external monitor 30 as the output destination of the RAW data. This is because OSD information such as a setting menu cannot be superimposed on the output RAW data. In order for the user to use the setting menu in this state, it is conceivable to additionally prepare a display apparatus (e.g., the monitor 32 or the information terminal 34) different from the external monitor 30 as an output destination of the RAW data and connect the display apparatus to the digital camera 10. However, when the additional display apparatus as described above is not prepared, it is conceivable to have a situation in which the RAW output setting cannot be returned to OFF temporarily the user turns ON the RAW output setting.

Thus, in the digital camera 10 in the present embodiment, an input interface that responds to a user's instruction regarding RAW output setting is provided separately from the setting menu. Accordingly, in the digital camera 10 of the present embodiment, the RAW output setting can be returned to OFF by the input interface when the user desires even without using the display of the setting menu in the state where the RAW output setting is ON. Hereinafter, the operation of the digital camera 10 will be described in detail.

2-2. Details of Operation

In the digital camera 10 of the present embodiment, the Fn button 156, to which the ON/OFF function of the RAW output setting is assigned, is an example of the above-described input interface. The operation of the digital camera 10 when the assignment is performed in advance will be described with reference to FIGS. 4 to 5.

Figure 4:
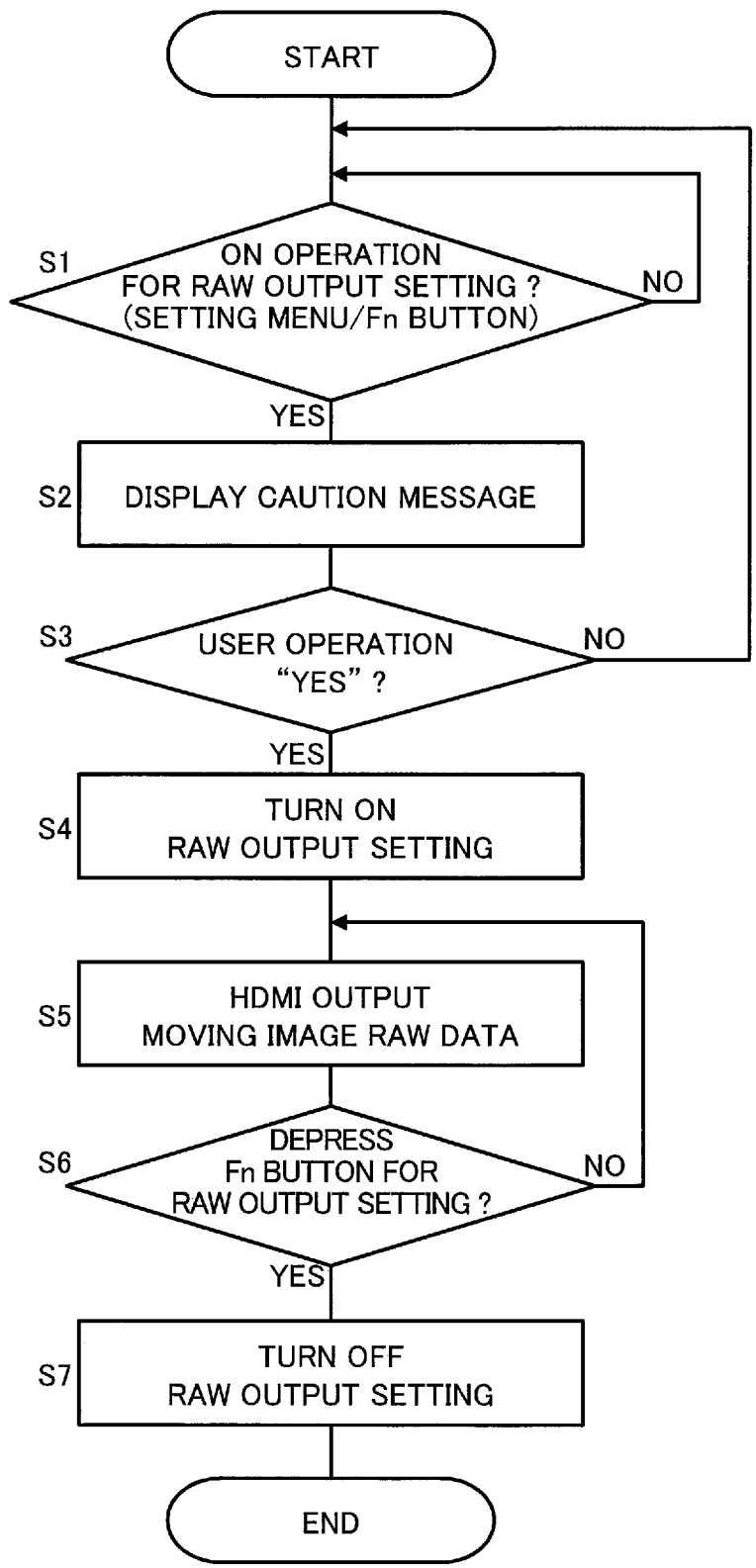
FIG. 4 is a flowchart illustrating an operation of a RAW output setting in the digital camera.

FIG. 4 is a flowchart illustrating an operation of RAW output setting in the digital camera 10. The processing shown in the flow in FIG. 4 is started in a state where the RAW output setting of the digital camera 10 is OFF, and is executed by the controller 180. Hereinafter, a case where the external monitor 30 is connected to the HDMI terminal 110 and the other display apparatuses 32 and 34 are not connected to the digital camera 10 will be described.

First, the controller 180 detects an input of a user operation for switching the RAW output setting from OFF to ON in the digital camera 10 (S1). For example, the user operation to be detected in step S1 may be an operation of depressing the Fn button 156 or an operation of RAW output setting in a setting menu.

When the ON operation of the RAW output setting is not input (NO in S1), the controller 180 does not particularly output the RAW data of the imaging result of the image sensor 140 to the external monitor 30 even when the RAW data is generated, and repeats the detection in step S1. At this time, various information other than RAW data may be output from the digital camera 10 to the external monitor 30 via the HDMI terminal 110. For example, image data obtained by performing development processing on RAW data, or data for displaying setting information such as a setting menu may be output as an image signal. On this occasion, in the digital camera 10, the development processing described above, processing of superimposing a setting menu on a developed image, or the like are performed.

When the ON operation of the RAW output setting is input (YES in S1), the controller 180 causes the external monitor 30 to display a screen of a predetermined caution message by data communication via the HDMI terminal 110, for example (S2). A display example in step S2 will be described with reference to FIG. 5.

Figure 5:
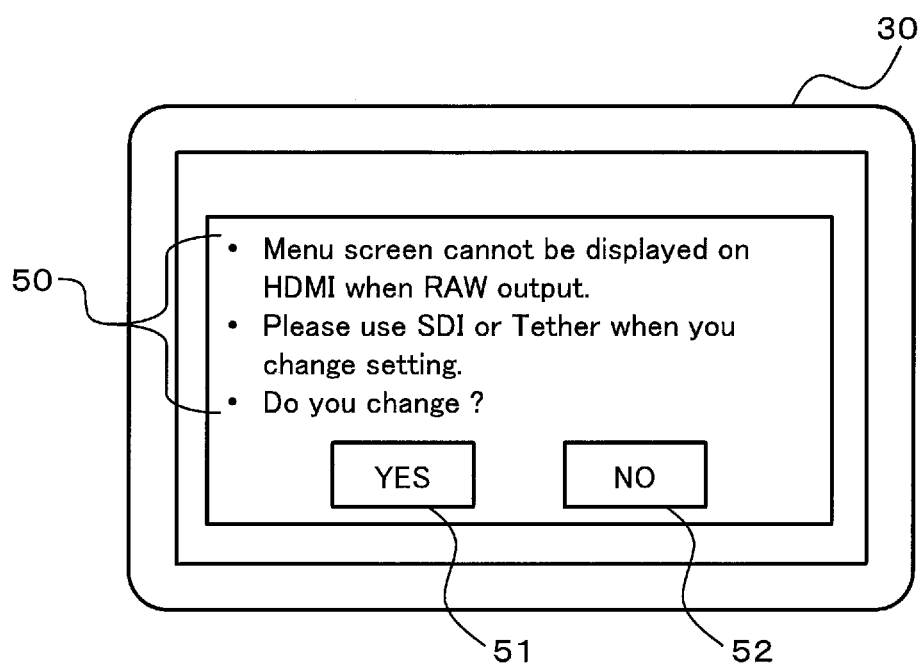
FIG. 5 is a diagram showing a display example of an external monitor connected to the digital camera.

FIG. 5 shows a display example of a caution message screen displayed on the external monitor 30 connected to the digital camera 10. In the present example, the caution message screen is displayed as a pop-up or the like on the external monitor 30 under the control (S2) of the controller 180, and includes a caution message 50 and YES/NO options 51 and 52.

The caution message 50 includes three notification contents as shown in FIG. 5, for example. The first notification contents are a warning of notifying the user beforehand that the setting menu is not displayed on the external monitor 30 connected to the HDMI terminal 110 in the ON state of the RAW output setting. The second notification contents are a proposal for urging the user to separately prepare a display apparatus for displaying the setting menu by the SDI terminal 112 or the Tether connection. The third notification contents are confirmation for causing the user to select whether or not to change the RAW output setting from OFF to ON.

For example, in a state where the caution message screen shown in FIG. 5 is displayed on the external monitor 30, the controller 180 receives a user operation of selecting any one of the YES/NO options 51 and 52 using the selection button 154 or the like (S3).

For example, when the option 52 of "NO" is selected by the user operation and the option 51 of "YES" is not selected (NO in S3), the controller 180 controls the external monitor 30 so that the external monitor 30 deletes the caution message screen displayed from the HDMI terminal 110, and returns to the processing in step S1.

On the other hand, when the option 51 of "YES" is selected by the user operation (YES in S3), the controller 180 turns ON (i.e., applies) the RAW output setting to the digital camera 10 (S4). For example, the controller 180 performs various setting changes for enabling the digital camera 10 to output RAW data of a moving image from the HDMI terminal 110 to the external monitor 30. On this occasion, when a display apparatus different from the external monitor 30 is not particularly connected to the digital camera 10, the controller 180 may set the user operation for displaying the setting menu as disabled.

The controller 180 outputs the moving image RAW data generated in the digital camera 10 to the external monitor 30 via the HDMI terminal 110 (S5). For example, in the digital camera 10, the image sensor 140 performs an imaging operation and sequentially generates RAW data indicating an imaging result. The controller 180 outputs RAW data for each frame at a predetermined frame rate to the external monitor 30 as moving image RAW data, for example. The moving image RAW data may be generated by appropriately performing processing different from the development processing on the imaging result of the image sensor 140 in the image processor 160, for example.

In the ON state of the RAW output setting, the controller 180 detects an input of a user operation of depressing the Fn button 156 at any time (S6). The detection target in step S6 is a user operation for switching the RAW output setting from ON to OFF (i.e., canceling the RAW output setting).

When the depressing operation on the Fn button 156 is not input in the ON state of the RAW output setting (NO in S6), the controller 180 continues to output the moving image RAW data from the HDMI terminal 110 to the external monitor 30 (S5).

On the other hand, when the depressing operation on the Fn button 156 is input in the ON state of the RAW output setting (YES in S6), the controller 180 turns OFF (i.e., cancels) the RAW output setting in the digital camera 10 (S7). For example, in step S7, the controller 180 stops outputting of the moving image RAW data from the HDMI terminal 110 to the external monitor 30. The controller 180 may output, to the external monitor 30, an image signal indicating the developed image data in YC format or the like instead of RAW format.

The controller 180 controls the digital camera 10 to be in the OFF state of the RAW output setting (S7), and ends the processing shown in the present flow.

According to the above processing, even when the menu is not displayed on the external monitor 30 with the moving image RAW data being output from the HDMI terminal 110 in the digital camera 10 to the external monitor 30, the RAW output setting can be turned OFF at any time by the depressing operation on the Fn button 156 (S5 to S7). The cancellation of the RAW output setting can be performed even in a state where a display apparatus different from the external monitor 30 cannot be prepared and a menu cannot be displayed in particular. Thus, and this can facilitate the user to use the RAW output settings.

In the above description, as illustrated in FIG. 5 in step S2, an example in which three notification contents are included in the caution message 50 has been described. The caution message 50 displayed in step S2 is not particularly limited to the example in FIG. 5, and may include any one or two notification contents without including all of the three notification contents, for example.

2-2-1. Forced OFF Processing

In the digital camera 10, a case is assumed where the ON/OFF function of the RAW output setting described above is not assigned to the Fn button 156 due to user setting or the like. The digital camera 10 of the present embodiment receives an instruction to forcibly turn OFF the RAW output setting even in such a case. The forced OFF processing will be described with reference to FIG. 6.

Figure 6:
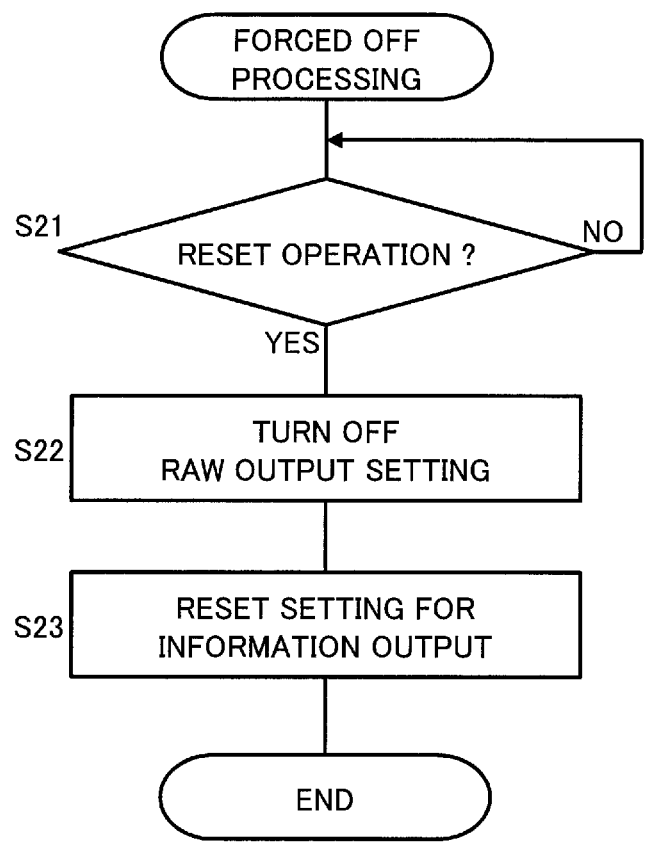
FIG. 6 is a flowchart for illustrating forced OFF processing of the digital camera.

FIG. 6 is a flowchart for illustrating forced OFF processing of the digital camera 10. The processing shown in the flowchart in FIG. 6 is executed by the controller 180 in parallel with the processing illustrated in FIG. 4 in a state where the RAW output setting is ON, for example.

First, the controller 180 detects whether or not a predetermined reset operation is input in the digital camera 10 (S21). The reset operation is a user operation preset to forcibly return the operation setting related to information output or the like of the digital camera 10 to an initial state or the like. For example, the reset operation is a multiplex pressing operation of simultaneously depressing a plurality of buttons 155, 156, and 158 of a specific combination.

When the reset operation is not input (NO in S21), the controller 180 does not particularly change the setting of the digital camera 10, and repeats the detection in step S21. For example, when the RAW output setting is in the ON state, outputting of the moving image RAW data is continued.

When the reset operation is input (YES in S21), the controller 180 switches the RAW output setting of the digital camera 10 from ON to OFF (S22). The processing in step S22 is performed similarly to step S7 in FIG. 4.

In addition, the controller 180 resets a setting different from the RAW output setting regarding the information output from the digital camera 10, for example (S23). For example, the digital camera 10 has an information display setting being a setting for preselecting an apparatus caused to display information such as a setting menu (see FIG. 3). In step S23, the controller 180 forcibly changes the information display setting to "AUTO" being the initial setting, for example.

The "AUTO" of the information display setting is a setting state in which a target for displaying setting information such as a setting menu is automatically selected from connection destinations of the HDMI terminal 110 and the SDI terminal 112, for example. For example, in addition to "AUTO", the information display setting has setting states such as "HDMI" for fixing an apparatus to be displayed to a connection destination of the HDMI terminal 110, "SDI" for fixing an apparatus to be displayed to a connection destination of the SDI terminal 112, and "OFF" for not displaying information to any connection destination.

When resetting the setting for the information output of the digital camera 10 (S23), the controller 180 ends the processing shown in the present flow.

According to the forced OFF processing of the digital camera 10 described above, for example, even in an emergency situation where the RAW output setting is turned ON with the ON/OFF function of the RAW output setting not assigned to the Fn button 156, the RAW output setting can be forcibly turned OFF (S21 to S22).

In addition, resetting the information display setting together with the RAW output setting (S23) allows a setting menu to be displayed on the connection destination of the digital camera 10, such as the external monitor 30, after the reset operation, for example. As described above, it is possible for the user to collectively handle, by the reset operation, the emergency situation in which the setting menu or the like cannot be displayed. Thus, it is possible for the user to easily use the settings of various outputs of the digital camera 10.

3. Effects and the Like

As described above, the digital camera 10 according to the present embodiment is an example of a digital camera 10 that does not include a display that displays a setting menu (see FIG. 3) being an example of setting information for operation setting in the own apparatus. The digital camera 10 includes an image sensor 140 being an example of an image sensor, an HDMI terminal 110 being an example of an output interface, and a controller 180. The image sensor 140 captures a subject image to generate image data. The HDMI terminal 110 is connected to an external monitor 30 being an example of an external apparatus, to output image data. The controller 180 controls a RAW output setting being an example of an output setting for outputting image data in a RAW format being an example of a predetermined format, that is, RAW data from the HDMI terminal 110 to the external monitor 30. In a state where the RAW output setting is applied (ON), the setting menu for canceling the RAW output setting is not displayed on the external monitor 30 being the output destination of the RAW data by the HDMI terminal 110. The digital camera 10 further includes a user interface 150 such as an Fn button 156 as an example of an input interface that receives an instruction to cancel (OFF) the RAW output setting from the state where the RAW output setting is applied.

According to the above digital camera 10, even when the setting menu is not displayed on the external monitor 30 in a state where the RAW output setting is turned ON, the input interface that responds to the instruction to cancel the RAW output setting can avoid a situation where the RAW output setting cannot be returned to OFF. Accordingly, in the digital camera 10 in which the setting menu and the like are not displayed, it is possible to suppress a situation in which it is difficult to use the RAW output setting, and possible to facilitate use of the setting of outputting data to the external apparatus.

In the digital camera 10 of the present embodiment, in a state where the RAW output setting is applied (S4 to S6, S21), the input interface responds to the instruction to cancel the RAW output setting without causing the external display apparatuses 32 and 34 to display a setting menu for canceling the RAW output setting (S7, S22). Accordingly, the user can return the RAW output setting of the digital camera 10 to OFF without particularly preparing the additional display apparatuses 32 and 34 in addition to the external monitor 30 being the output destination of the moving image RAW data, and the RAW output setting can be easily used.

In the digital camera 10 of the present embodiment, when an instruction to apply the RAW output setting is input in a state where the RAW output setting is not applied (YES in S1), the controller 180 causes the external monitor 30 being an output destination to display a predetermined message such as a caution message 50 (S2). The predetermined message includes at least one of a notification of giving an advance notice that the setting menu is not displayed on the external monitor 30 being the output destination when the RAW output setting is applied, a notification of urging preparation of display apparatuses 32 and 34 different from the external monitor 30 being the output destination, or a notification of confirming whether or not to apply the RAW output setting (see FIG. 5). The notification allows the user to easily use the RAW output setting.

The digital camera 10 of the present embodiment further includes a user interface 150 that receives a user operation according to a setting menu displayed on the external monitor 30 in a state where the RAW output setting is not applied. That is, the external monitor 30 can display a setting menu in a state where the RAW output setting is not applied. When the RAW output setting is OFF, the user can display a setting menu on the external monitor 30 to use various settings.

In the digital camera 10 of the present embodiment, the input interface includes an Fn button 156 as an example of an operation member to which a function of switching whether or not to apply the RAW output setting is assigned, in the operation member in the user interface 150 provided in the digital camera 10. An instruction to cancel the RAW output setting when the RAW output setting is ON can be input using the Fn button 156 to which the above function is assigned (S6).

In the digital camera 10 of the present embodiment, the user interface 150 being an example of the input interface receives an instruction to cancel the output setting according to a predetermined user operation such as a preset reset operation regardless of whether or not the switching function is assigned to the Fn button 156 (S21). Accordingly, even when the RAW output setting is turned ON with the function described above not assigned to the Fn button 156, the RAW output setting can be forcibly returned to OFF.

In the digital camera 10 of the present embodiment, the predetermined format is a RAW format corresponding to a state where the image sensor 140 has performed imaging. The target image data output from the output interface in the RAW output setting is, for example, moving image RAW data. The image data being an output target is not necessarily limited to moving image RAW data, and may be still image RAW data, for example. The predetermined format may be a format incapable of superposing OSD or GUI (e.g. caption or setting information) with the data such as RAW data.

In the digital camera 10 of the present embodiment, the HDMI terminal 110 being an example of an output interface outputs image data to the external monitor 30 in conformity with the HDMI standard. The communication standard by the output interface is not necessarily limited to the HDMI standard, and may be various communication standards in which predetermined format image data such as RAW data can be output.

Other Embodiments

As described above, the first embodiment has been described as an exemplification of the technique disclosed in the present application. However, the technique in the present disclosure is not limited thereto, and can also be applied to embodiments in which changes, substitutions, additions, omissions, and the like are made as appropriate. In addition, it is also possible to combine each component described in the above embodiment to form a new embodiment. Thus, in the following, other embodiments will be exemplified.

In the first embodiment described above, an operation example when only the external monitor 30 being the output destination of the moving image RAW data is connected to the digital camera 10 has been described. In the present embodiment, in addition to the external monitor 30, a display apparatus such as the monitor 32 or the information terminal 34 may be connected to the digital camera 10. For example, with the moving image RAW data being output from the HDMI terminal 110 to the external monitor 30 in the digital camera 10, the setting menu of the digital camera 10 may be separately displayed on the display apparatuses 32 and 34 connected to the various terminals 112 and 114. In this case, a user operation for checking or changing various settings such as video quality of moving image RAW data in the digital camera 10 can be input using the displayed setting menu. In addition, a user operation of turning OFF the moving image RAW setting may be input.

As described above, the digital camera 10 of the present embodiment further includes the various connection terminals 112 and 114 as an example of a communication interface different from the output interface, and the user interface 150. The communication interface is connected to the external display apparatuses 32 and 34 separately from the output destination of the output interface to perform data communication, and the user interface 150 receives a user operation corresponding to the setting menu displayed on the display apparatus in a state where the RAW output setting is applied and the setting menu is not displayed on the external monitor 30 being the output destination.

Accordingly, for example, by using the various display apparatuses 32 and 24 with a combined use of the external monitor 30 that is the output destination of the moving image RAW data, the user can easily use the digital camera 10 such as being able to use the setting menu. For example, an instruction to turn OFF the moving image RAW setting from the setting menu may be input by a user operation of the user interface 150 according to the setting menu, or may be input to the digital camera 10 via the connection terminal 114 from an operation of the information terminal 34 or the like.

In the above embodiments, the example in which the ON/OFF function of the RAW output setting is assigned to the Fn button 156 has been described. To the Fn button 156, the function of turning ON the RAW output setting does not need to be assigned, and only the function of turning OFF the RAW output setting may be assigned. When the digital camera 10 is in an operation state where ON/OFF of the RAW output setting cannot be executed even with various display apparatuses used, the operation of the above Fn button 156 may be disabled.

In the above embodiments, the Fn button 156 has been exemplified as an example of the input interface in the digital camera 10. In the present embodiment, the input interface is not limited to the Fn button 156, and may be various user interfaces 150 in the digital camera 10. The input interface is not limited to the user interface 150, and may be configured to receive an instruction to cancel RAW output setting by voice input, for example. Alternatively, an interface circuit connected to a remote control unit or the like to which such a cancelation instruction can be input may be used.

In the above embodiments, the setting menu has been exemplified as an example of the setting information in the digital camera 10. In the digital camera 10 of the present embodiment, the setting information is not limited to the setting menu, and may be various information that can be operated and set in the digital camera 10, or may be various on-screen display (OSD) information.

In the above embodiments, the external monitor 30 has been described as an example of the external apparatus being the output destination of the output interface. In the present embodiment, the external apparatus is not particularly limited to the external monitor 30, and may be an information terminal such as a PC or an external recorder, for example.

In the above embodiments, an example of the configuration of the digital camera 10 has been described as an example of the imaging apparatus. In the present embodiment, the digital camera 10 is not particularly limited to the above configuration, and may have various configurations. For example, the digital camera 10 does not need to be an interchangeable lens type, and may be an integrated lens type. In addition, the digital camera 10 does not need to be particularly a box camera.

As described above, the embodiments are described as the exemplification of the technique in the present disclosure. To that end, the accompanying drawings and the detailed description are provided.

Therefore, among the components described in the accompanying drawings and the detailed description, not only the component essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiment is for illustrating the technique in the present disclosure, various changes, substitutions, additions, omissions, and the like can be made within the scope of the claims or the equivalent thereof.

The present disclosure is applicable to an imaging apparatus that does not include a display unit for displaying setting information for operation setting.

The invention claimed is:

1. An imaging apparatus not including a display that displays setting information for operation setting in the imaging apparatus, the imaging apparatus comprising:
   an image sensor that captures a subject image to generate image data;
   an output interface connected to an external apparatus to output the image data; and
   a controller that controls an output setting for outputting the image data in a predetermined format from the output interface to the external apparatus,
   wherein in a state where the output setting is applied, no setting information for canceling the output setting is displayed on the external apparatus serving as an output destination of the image data in the predetermined format by the output interface,
   wherein, in the state where the output setting is applied, the predetermined format is a data format in which the controller is unable to output the setting information superimposed on the image data, and the imaging apparatus further comprises an input interface that receives an instruction to cancel the output setting from the state where the output setting is applied.

2. An imaging apparatus not including a display that displays setting information for operation setting in the imaging apparatus, the imaging apparatus comprising:

an image sensor that captures a subject image to generate image data;

an output interface connected to an external apparatus to output the image data; and a controller that controls an output setting for outputting the image data in a predetermined format from the output interface to the external apparatus, wherein, in a state where the output setting is applied, the predetermined format is a data format in which the controller is unable to output the setting information superimposed on the image data, and the imaging apparatus further comprises an input interface that receives an instruction to cancel the output setting from the state where the output setting is applied.

3. The imaging apparatus according to claim 2, wherein the input interface receives the instruction to cancel the output setting, without causing an external display apparatus to display the setting information for canceling the output setting in the state where the output setting is applied.

4. The imaging apparatus according to claim 2, wherein the controller causes the external apparatus of the output destination to display a predetermined message when an instruction to apply the output setting is input in the state where the output setting is not applied, and the predetermined message includes at least one of: a notification to notify in advance that the setting information is not displayed on the external apparatus of the output destination when the output setting is applied; a notification to urge preparation of a display apparatus different from the external apparatus of the output destination; or a notification to confirm whether or not to apply the output setting.

5. The imaging apparatus according to claim 2, further comprising a user interface that receives a user operation according to setting information to be displayed on the external apparatus in the state where the output setting is not applied.

6. The imaging apparatus according to claim 2, further comprising:

a communication interface connected to an external display apparatus to communicate data therewith, and a user interface that receives a user operation according to displayed setting information on the display apparatus in the state where the output setting is applied with no setting information being displayed on the external apparatus of the output destination.

7. The imaging apparatus according to claim 2, wherein the input interface includes an operation member to which a switching function is assigned in operation members provided in the imaging apparatus, the switching function switching whether or not to apply the output setting.

8. The imaging apparatus according to claim 7, wherein the input interface receives the instruction to cancel the output setting, according to a predetermined user operation regardless of whether or not a function of the switching is assigned to the operation member.

9. The imaging apparatus according to claim 2, wherein the predetermined format is a RAW format corresponding to a state of imaging by the image sensor.

10. The imaging apparatus according to claim 2, wherein the output interface outputs the image data to the external apparatus in conformity with an HDMI standard.

* * * * *